United States Patent
Goodman et al.

(10) Patent No.: US 6,658,320 B2
(45) Date of Patent: Dec. 2, 2003

(54) EXPEDITED CALIBRATION FOR MULTIPLE ACCESSORS IN LIBRARY OF PORTABLE DATA STORAGE MEDIA

(75) Inventors: Brian Gerard Goodman, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 10/055,309

(22) Filed: Jan. 22, 2002

(65) Prior Publication Data

US 2003/0139846 A1 Jul. 24, 2003

(51) Int. Cl.[7] .................................................. G06F 7/00
(52) U.S. Cl. ....................................... 700/214; 700/254
(58) Field of Search ................................. 700/213, 214, 700/218, 245, 254, 255; 414/935

(56) References Cited

U.S. PATENT DOCUMENTS

| | | | |
|---|---|---|---|
| 4,908,777 A | 3/1990 | Wolfe | 364/513 |
| 5,303,034 A | 4/1994 | Carmichael et al. | 356/375 |
| 5,323,327 A | 6/1994 | Carmichael et al. | 364/478 |
| 5,914,919 A | 6/1999 | Fosler et al. | 369/34 |
| 6,115,648 A | 9/2000 | Gallo | 700/218 |
| 6,347,259 B1 * | 2/2002 | Goldenberg et al. | 700/218 |
| 6,351,685 B1 * | 2/2002 | Dimitri et al. | 700/214 |

* cited by examiner

Primary Examiner—Khoi H. Tran
(74) Attorney, Agent, or Firm—Dan Hubert & Associates

(57) ABSTRACT

A portable data storage media library includes multiple accessors, various designated access sites, and multiple calibration locations having various spatial relationships to the access sites. Calibration of the accessors begins by determining positional relationships between different accessors to different of the predetermined calibration locations, and determining a positional interrelationship between different accessors to at least one the predetermined calibration locations in common. The positional interrelationships are utilized to establish a positional relationship between each accessor and calibration locations for which the positional relationship has not been determined.

27 Claims, 4 Drawing Sheets

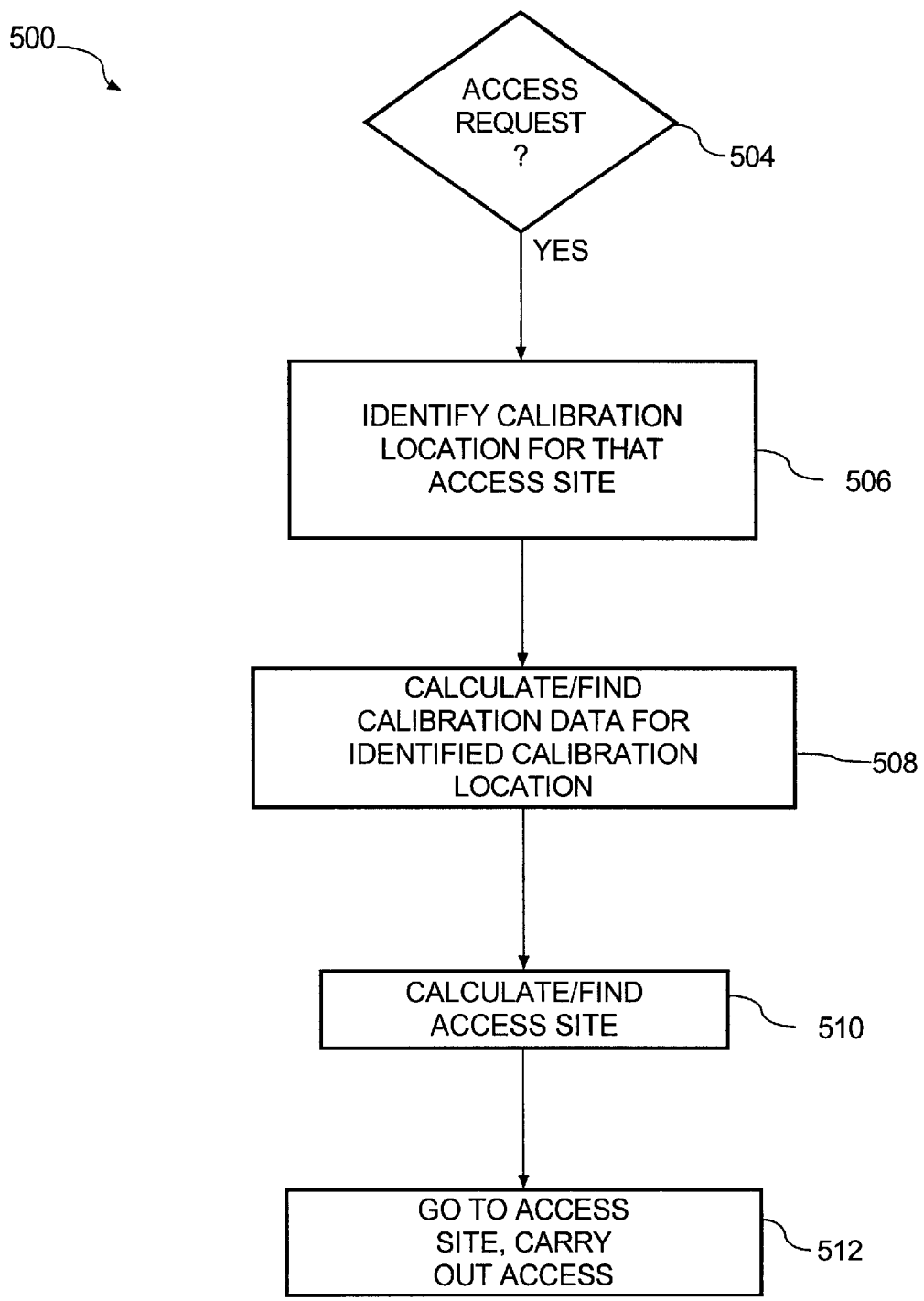

EXPEDITED CALIBRATION FOR MULTIPLE ACCESSORS IN LIBRARY OF PORTABLE DATA STORAGE MEDIA

BACKGROUND OF THE INVENTION

1. Field of the Invention

The present invention relates to libraries of portable data storage media where different accessors move the media between various storage slots, read and/or write drives ("read/write" drives), and other access sites. More particularly, the invention concerns such a library in which different accessors are calibrated to different calibration locations in order to properly recognize different access sites associated with those locations. Even though a particular accessor might not be calibrated to reach certain sites, this accessor can still access those sites by using (1) calibration data of another accessor that has been calibrated to calibration locations associated with those sites, in conjunction with (2) a spatial relationship between the subject accessor and the other accessor.

2. Description of the Related Art

The media library is one popular apparatus for inexpensively managing a large volume of data. Depending upon the application, the portable media may comprise magnetic tape cartridges, optical media cartridges, and the like. Different accessors, such as robotic arms or horizontally/vertically sliding grippers, move the media between various storage slots, read/write drives, and other access sites.

Presently, there are a number of dual accessor data storage libraries in production. Dual accessors complete storage tasks more quickly since they can share workload. They also provide redundancy in case one accessor fails. As with any library, whether dual or single accessor, calibration is an important step in setting up and operating the library. Namely, the library includes certain predesignated physical points and other such "calibration locations," which have a given relationship to storage slots, read/write drives, and other access sites in the library. Each accessor is independently calibrated to all of the calibration locations. In one example, the calibration locations comprise small reflective areas, and the accessors physical situs of the calibration locations by emitting and detecting reflection of a small spot of light. Once the calibration location is obtained, the accessor notes the (x,y) coordinate or other position reading of the calibration location, completing calibration for this calibration location. In some cases, accessors locate numerous calibration locations and interpolate between them to find an intermediate point.

Although the foregoing arrangements are satisfactory in many respects, engineers at International Business Machines Corp. ("IBM") are continually seeking to improve the performance and efficiency of dual accessor media libraries. In this respect, IBM engineers have recognized one potential limitation, in that calibration can be time consuming. In a large library, for instance, calibration can take nearly twenty minutes. With larger libraries, calibration is even more time consuming. Library performance definitely suffers during calibration, since the library is unable to access customer data during that time. Another potential limitation with dual accessor libraries is that valuable storage is occupied by the empirically determined coordinates of all calibration locations in the library as independently determined by each accessor. Furthermore, this storage space is doubled if the calibration data is backed up. In addition, managing data for the two accessors can be cumbersome, especially when managing backup data for each accessor.

Accordingly, the performance and efficiency of today's dual accessor libraries suffers due to the length of calibration time, and also due to the storage occupied by calibration data.

SUMMARY OF THE INVENTION

A portable data storage media library includes multiple accessors, various designated access sites, and multiple calibration locations having predetermined spatial relationships to the access sites. Initially, the accessors are physically calibrated to various calibration locations such that each calibration location has at least one accessor calibrated thereto (except for any calibration locations that are inactive, irrelevant to the current library configuration, or otherwise unused). Moreover, each accessor is physically calibrated to at least one calibration location in common with at least one other accessor. Next, physical calibration information is shared among the accessors. Each accessor then processes shared physical calibration information from other accessors to logically calibrate that accessor to all calibration locations for which the accessor has not been physically calibrated.

The invention affords its users with a number of distinct advantages. For example, multi-accessor calibration time can be significantly reduced by sharing the burden of calibration among accessors operating in parallel. Additionally, in one embodiment where some common calibration data is shared among the accessors, the overall volume of calibration data is reduced, preserving data storage space. The invention also provides a number of other advantages and benefits, which should be apparent from the following description of the invention.

BRIEF DESCRIPTION OF THE DRAWINGS

FIG. 5 is a flowchart of a second exemplary access sequence.

DETAILED DESCRIPTION

The nature, objectives, and advantages of the invention will become more apparent to those skilled in the art after considering the following detailed description in connection with the accompanying drawings.

Hardware Components & Interconnections

Library & Components

Figure 1:
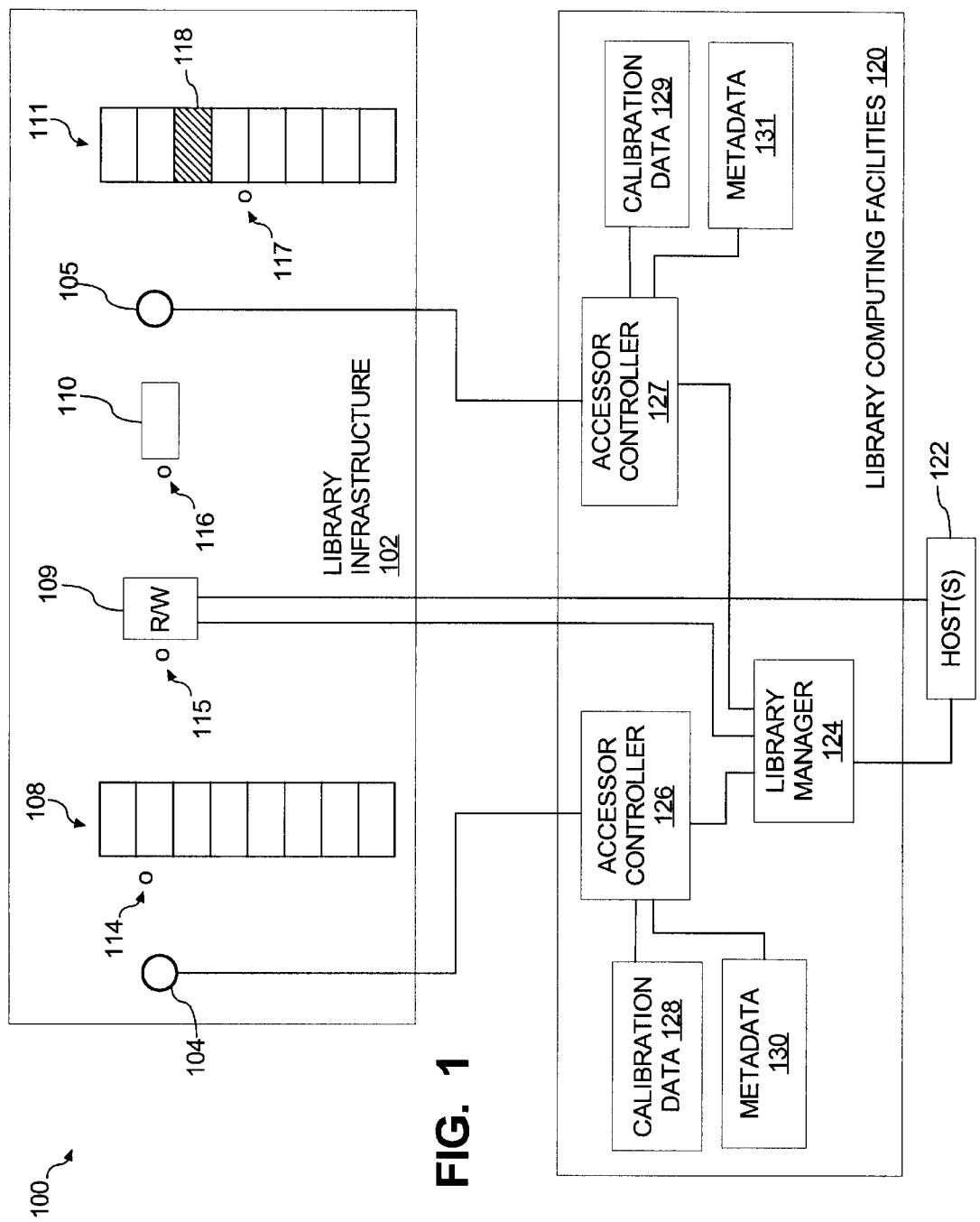
FIG. 1 is a block diagram of the hardware components and interconnections of a library of portable data storage media.

One aspect of the invention concerns a library of portable data storage media, which may be embodied by various hardware components and interconnections, with one example being described by the library 100 of FIG. 1. One part of the library 100 is the library infrastructure 102, which includes multiple accessors 104–105 and various access sites 108–111. Each of the accessors 104–105 comprises a robotic arm, x-y carriage, or any other mechanism for moving portable data storage media among the various locations 108–111 of the infrastructure 102. Two accessors are shown for illustration, even though the library 100 may include more if desired. In this example, the accessors 104–105 move left/right along a common horizontal ("x")

track, and up/down on independent vertical ("y") axes. The accessors therefore comprise left 104 and right 105 accessors. The access sites include media storage slots 108, 111, import/export slots such as 110, read/write drives such as 109, and other destinations for portable data storage media. An exemplary item of storage media 118 is shown residing in one of the storage slots 111.

In addition to the accessors and access sites, the infrastructure 102 includes various calibration locations 114–117. The calibration locations 114–117 comprise distinctive touch points, fiducials, reflective surfaces detectable by light emitter/sensor elements in the accessors 104–105, or another type of calibration device and location as known in the art. Each calibration location corresponds to a predetermined set of one or more access sites. For instance, calibration locations 114–117 correspond to access sites 108–111, respectively.

The library 100 also includes library computing facilities 120. The facilities 120 carry out storage requests from one or more hosts 122 by directing the accessors 104–105 to move storage media among the access sites 108–111. Optionally, the facilities 120 may also carry out storage requests from the hosts 122 by reading/writing data from/to media loaded in the read/write drive 115. Alternatively, or in addition, the hosts 122 may directly read/write data from/to media loaded in the read/write drive. The facilities 120 also perform various internal operations to configure, troubleshoot, preserve, and otherwise manage the components of the infrastructure 102. One of these operations is calibration, which uses the calibration locations 114–117 as discussed in greater detail below.

The facilities 120 may be implemented with a variety of different subcomponents, as will be apparent to ordinarily skilled artisans having the benefit of this disclosure. In the illustrated example, the facilities 120 include a library manager 124, accessor controllers 126–127, calibration data 128–129, and metadata 130–131. The accessor controller 126, accessor 104, calibration data 128, and metadata 130 are associated with each other, and function as one accessor unit. Similarly, the accessor controller 127, accessor 105, calibration data 129, and metadata 131 are associated with each other, and function as one accessor unit. Although two sets of accessor controllers and calibration data are shown for the present example of two accessors, a proportionately greater number may be used for implementations with more than two accessors.

The accessor controllers 126–127 may comprise physical controller machines, programming threads, application programs, subcomponents of the same machine, or any other suitable arrangement of hardware and/or software. The calibration data 128–129 and metadata 130–131 may be implemented by individual or combined constructs such as memory registers, buffers, volatile or nonvolatile storage devices or subcomponents thereof, firmware, or a combination thereof.

The library manager 124 carries out data storage and retrieval requests from the host(s) 122 by issuing movement commands to the accessor controllers 126–127. Optionally, the manager 124 may additionally conduct read/write data between the hosts 122 and media loaded to the read/write drive 109. In response to each movement command, each accessor controller 126–127 provides instructions to its corresponding accessor 104–105 governing the accessor's physical movement about the library infrastructure 102. These instructions occur on a level of suitable complexity for the machinery of the accessors 104–105.

Each accessor controller 126, 127 corresponds to one of the accessors 104, 105, respectively. Likewise, calibration data related to each accessor 104, 105 is stored in 128, 129, respectively, and metadata related to each accessor 104, 105 is stored in 130, 131, respectively. In each case, the calibration data 128,129 contains various data required for the corresponding accessor 104, 105 to physically move to the calibration locations in the infrastructure 102. Particular contents of the calibration data may vary depending upon the exact application, but some exemplary calibration data includes the following:

1. Precise coordinates of one or more calibration locations physically found by the corresponding accessor. One alternative uses "offsets" from prescribed, nominal calibration locations, where these offsets aid the accessor in reaching the calibration locations, e.g., an offset of (2,3) required to access nominal calibration location (100,100).
2. Coordinates of one or more calibration locations physically found by the other accessor, and shared with the subject accessor. One alternative uses the other accessor's offsets from the nominal coordinates.
3. A spatial relationship between the accessors, determined by comparing the accessors' coordinates or offsets for one or more calibration locations in common.
4. Coordinates or offsets of the other accessor's calibration locations revised to account for the spatial relationship between the accessors, so that these coordinates or offsets are specifically applicable to the current accessor.

In one alternative, some or all of the calibration data may be stored in a single location (such as 128, 129 or another repository) and such data shared between the accessor controllers in order to conserve storage space. Shared data may still be used by accessors that did not physically prepare the calibration data as long as that accessor conditions the data according to the relationship between the accessors, as explained in greater detail below.

In one example, each metadata 130, 131 includes a record of the nominal calibration locations, namely, the uncalibrated coordinates of the calibration locations. This information is used by the accessors to get close enough to the calibration locations so that they can be found while the accessors are calibrating to that location. These nominal coordinates may be determined, for example, by technicians upon design, construction, development, manufacturing, or installation of the infrastructure 102. The metadata 130, 131 may also include the relative positions of each access site to its corresponding calibration location, e.g., the offset of read/write drive 109 from its associated calibration location 115. These relative positions are also determined by technicians upon design, construction, development, manufacturing, or installation of the infrastructure 102.

The foregoing description constitutes one library embodiment. As one example, this library may be implemented by an IBM model 3584 Ultra Scalable Tape Library. In addition, this disclosure contemplates various alternatives to the foregoing arrangement 100. For instance, some or all of the accessor controllers may be implemented as separate processing threads, subroutines, applications, memory spaces, or other devices within common accessor controller hardware, the library manager 124, or a different machine. As another alternative, the library manager 124 may be omitted, in which case the hosts 122 communicate directly with the accessor controllers 126–127. Still further, there may be more than one library manager 124.

Exemplary Digital Data Processing Apparatus

Figure 2:
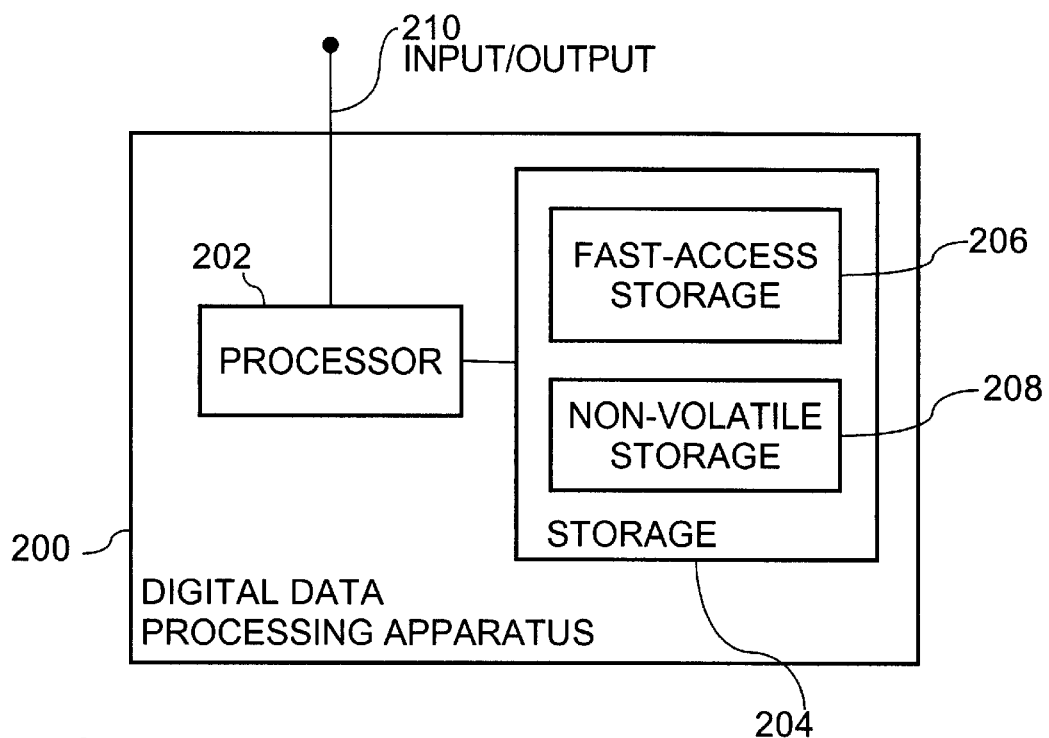
FIG. 2 is a block diagram of a digital data processing machine.

Processing components such as the accessor controllers 126–127 and library manager 124 may be implemented in various forms. As one example, these components may be individually implemented in separate digital data processing apparatuses, or collectively implemented in a single such apparatus. In any case, FIG. 2 depicts the hardware components and interconnections of an exemplary digital data processing apparatus 200.

The apparatus 200 includes a processor 202, such as a microprocessor, personal computer, workstation, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, ROM, one or more magnetic data storage disks such as a "hard drive", a tape drive, or any other suitable storage device. The apparatus 200 also includes an input/output 210, such as a line, bus, cable, communications interface, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206,208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), programmable logic device ("PLD"), and the like.

Operation

Having described various structural features, various exemplary operational sequences are now described to illustrate multi-accessor calibration in a library of portable data storage media.

Signal-Bearing Media

Figure 3:
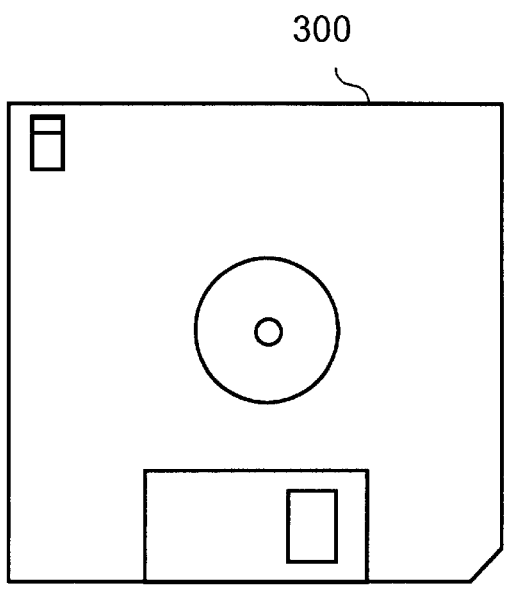
FIG. 3 shows an exemplary signal-bearing medium.

Wherever the functionality of the invention is implemented using machine-executed program sequences, these sequences may be embodied in various forms of signal-bearing media. In the context of FIG. 2, this signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, flash PROM, EPROM, or EEPROM), battery backup RAM, optical storage (e.g., CD-ROM, WORM, DVD), or other suitable signal-bearing media including analog or digital transmission media, analog and communication links, and/or wireless communications. In an illustrative embodiment of the invention, the machine-readable instructions may comprise software object code, assembled from assembly language, compiled from a language such as C, etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Calibration Sequence

Figure 4:
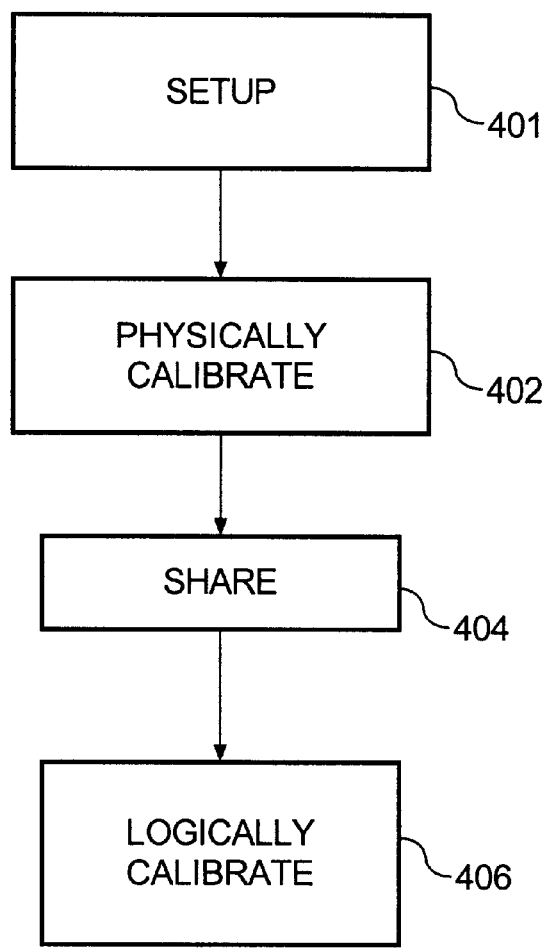
FIG. 4 is a flowchart of a first exemplary calibration sequence.

FIG. 4 shows an exemplary calibration sequence 400. Each accessor controller performs this sequence to calibrate its associated accessor. For ease of explanation, but without any intended limitation, the example of FIG. 4 is described in the context of the accessor controller 126 and its related components in the library 100.

The sequence 400 is initiated when the accessor 104 is installed, reconfigured, repaired, recalibrated, or another situation appropriate to calibration. As another example, the accessor controller 126 may perform the sequence 400 when the another accessor is added to the system, reconfigured, brought back on line, etc. As still another option, the controller 126 may perform step 401 when the system is installed or otherwise reconfigured, and steps 402–406 when calibration is required.

In step 401, design engineers establish the accessors' manner of reporting motion in the horizontal ("x") and vertical ("y") directions. In one example, each accessor has a home position, with (0,0) coordinates. This position may, for example, comprise fully left/down (for the left accessor 104) and fully right/down (for the right accessor 105). Continuing this same example, both left and right accessors regard upward movements with increasing y coordinates, and both accessors regard movement to the right with increasing x coordinates, and movement to the left with decreasing x coordinates. As a result, all positions incur negative x coordinates for the right accessor 105. One option to further simplify this example is to give one accessor, a non (0,0) home position so that the accessors utilize the same coordinate system. With this option, then, both accessors nominally regard the same location/site with the same coordinate. As a different alternative, each accessor may regard any relative x movement from its home position to incur increasing x coordinates, whether this is actually rightward movement (for the left accessor 104) or leftward movement (for the right accessor 105).

In case there is any difference in the accessors' distance measuring capability in the x direction, an additional operation may be performed. Namely, the accessor 104 is first moved to its home position and its x coordinate noted there, then moved fully rightward (abutting the accessor 105) and its x coordinate noted there, the difference representing the left accessor's assessment of the total x direction. The same procedure is repeated for the accessor 105. In some cases, due to imperfections in their measurement equipment, the accessors may give slightly different readings of the total x direction, for example, a reading of 9,997 for one accessor and a reading of 10,025 for the other accessor. This information is useful, as described below, for each accessor to condition otherwise slightly erroneous calibration information from the other accessor.

After step 401, which may also include such other setup operations as necessary or appropriate, step 402 is performed. In step 402, the accessor controller 126 directs the accessor 104 to calibrate to one or more calibration locations, which include at least one "common" calibration location to which the other accessor controller 127 also calibrates. The common calibration locations are designated by mutual agreement among the accessor controllers 126–127, predesignated in memory accessible to the controllers 126–127, or another technique. In step 402, the accessor controller 126 may calibrate to some, all, or no other locations. Calibration locations are "unique" to one accessor if the other accessor controller does not calibrate to them. When step 402 has been performed by both accessors 104–105, each calibration location has at least one accessor calibrated thereto, except for any calibration locations that are inactive, irrelevant to the current library configuration, or otherwise unused.

The process of calibrating to a particular calibration location is performed using techniques well known in the art, such as moving the accessor 104 to find the calibration location by trial and error, and then noting any offset between (a) the ending accessor position as directed by the accessor controller 126, and (b) the calibration location's nominal position in the infrastructure 102 from 130. The act of "finding" a calibration location depends on the nature of the calibration location itself, for example, distinctive touch point, reflective area, etc. As one example of finding a calibration location by trial and error, the controller 126 might find that it has to instruct the accessor 104 to move to coordinate (97,104) in order for the accessor 104 to find a calibration location nominally located at coordinate (100, 100). An alternative is to reset the accessor controller's coordinate system according to the actual location of one calibration location, in other words, resetting the accessor controller so that the calibration location's actual position at the calibration location is assumed to be the nominal position. At any rate, the accessor controller 126 stores the calibration data from step 402 in 128.

In step 404, the accessor controller 126 shares calibration information with the accessor controller 127. To minimize data exchange, the accessor controllers may limit sharing to one common calibration location and each accessor controller's unique calibration locations. In this way, each accessor controller obtains the other accessor's calibration data for its unique calibration locations.

In step 406, the accessor controller 126 uses the other accessor's calibration data (shared in step 404) to logically calibrate to the other accessor's calibration locations. More particularly, in step 406, the accessor controller 126 uses the other accessor's calibration data for the common calibration location to determine the relative relationship between the accessors 104, 105. For example, where the accessors' home positions have been synchronized to a universal coordinate system, if the accessor 104 requires an input of (96,103) to reach the nominal coordinate (100,100), and the accessor 105 requires an input of (97,104) to reach the same coordinate, then the relative relationship of the accessor 104 to the accessor 105 is (+1,+1).

A different technique is used where the accessors' home positions have not been synchronized to a universal coordinate system, namely where the accessors have separate home (0,0) positions and the left accessor 104 regards rightward movements as positive, and the right accessor 105 regards leftward movements as negative. In this example, the relationship between the accessors x direction coordinates is shown by Equation 1, below.

$$\text{accessor 104 coordinate} = \text{total x distance} - \text{accessor 105 coordinate}. \quad [\text{Eq. 1}]$$

Continuing with the same example, the total x distance is 10,000 and the left accessor 104 requires an input of (96,103) to reach the nominal coordinate (100, 100); the right accessor 105 requires an input of (9899,97) to reach this same coordinate which is nominally known to the accessor 105 as (9900,100). In this case, the relative relationship of the accessor 104 to the accessor 105 is shown by Equation [2], below.

$$\text{accessor 104 version of accessor 105's x coordinate} = \quad [\text{Eq. 2}]$$
$$10{,}000 - 9899 = 101$$

Therefore the relationship of the accessor 104 to the accessor 105 in the x direction is shown by Equation 3, below.

$$\text{accessor 104 version of accessor 105's x coordinate} - \quad [\text{Eq. 3}]$$
$$\text{accessor 104 x coordinate} = 101 - 96 = +5$$

The y direction offset is shown by Equation 4, below.

$$97 - 103 = -6 \quad [\text{Eq. 4}]$$

Therefore, the relationship of the accessor 104 to the accessor 105 is (+5,−6).

The foregoing techniques may be further modified if the accessors 104–105 measure the same distance slightly differently. As mentioned above, in some cases, due to imperfections in their measurement equipment, the accessors may give slightly different readings of the total x direction, for example, a reading of 9,997 for the accessor 104 and a reading of 10,025 for the accessor 105. In this case, the computation of relative offsets between the accessors is conditioned accordingly. For example, instead of using Equation 1 (above), the formula of Equation 5 is used, as shown below.

$$\text{accessor 104 coordinate} = \quad [\text{Eq. 5}]$$
$$(\text{total x measured by accessor 105} -$$
$$\text{accessor 105 coordinate}) *$$
$$\text{total x measured by accessor 104} / \text{total x}$$
$$\text{measured by accessor 105} =$$
$$(10{,}025 - \text{accessor 105 coordinate}) * 9{,}997 / 10{,}025$$

After the accessor controller 126 uses the other accessor 105's calibration data for the common calibration location to determine their relative relationship, the next operation in step 406 is as follows. The accessor controller 126 revises the other accessor's shared calibration data according to the computed relative relationship to arrive at logical calibration data for these same calibration locations. For instance, even if the accessor controller 127 uniquely calibrates to the calibration location 117, the accessor controller 126 can logically calibrate to this site by receiving the controller 127's calibration data for this site and modifying it by the computed relative relationship or offset between the accessors. This process takes into account the respective coordinate systems, measurement inconsistencies, and other differences in the accessors as discussed above.

As an alternative to revising the other accessor's data as described above, the accessor controller 126 may completely revise its coordinate system to match that of the accessor controller 127, making any revisions unnecessary. As one exemplary implementation, the accessor controller 126 resets its coordinate system by changing the (x,y) coordinate of its physical home position from (0,0). For instance, where the relative relationship of the accessor 104 to the accessor 105 is (+1,+1), the accessor 104 may reset its coordinate system so that the physical home position (formerly known as (0,0)) is now (1,1). In this example, when the accessor controller 126 encounters a calibration location that was found by the accessor controller 127, the accessor controller 126 resets its x coordinate value to be equal to the value that the accessor controller 127 recorded. In this way, the accessor controller 126 may proceed to use the other accessor's calibration data without modification. With the foregoing approach, however, an accessor must wait to perform any of its own physical calibration until after adjusting its coordinate system to the other accessor.

In still another embodiment, the accessor controller 126 may defer logical calibration until needed to access one of the access sites. For example, the accessor controller 126 may wait until the library manager 124 first requests access to each of the access sites before logically calibrating to the associated calibration location.

To complete step 406, the accessor controller 126 stores the revised (logically calibrated) data in 128. The revised data may be stored, for example, in substitution for the raw calibration data shared by the other accessor.

Although not mentioned above (for ease of discussion), there may be multiple calibration locations that correspond to a single access site or set of access sites. Ordinarily skilled artisans will be familiar with the techniques for calibrating a single accessor to multiple calibration locations related to a single access sites, for example to compensate for perpendicularity of the mechanism. Accordingly, the calibration operations discussed herein contemplate such activity for multiple accessors if appropriate to the application at hand.

Access Sequence

FIG. 5 shows an exemplary access sequence 500. Each accessor controller performs this sequence to carry out requests to access portable data storage media in the library infrastructure 102. For ease of explanation, but without any intended limitation, the example of FIG. 5 is described in the context of the accessor controller 126 and its related components in the library 100.

Accordingly, the controller 126 first asks whether it has received an access request from the library manager 124 and/or host 122 (step 504). The access request specifies at least one access site. Responsive to the access instruction, the controller 126 determines which calibration location corresponds to the requested access site (step 506). For example, using the metadata 130, the controller 128 may determine that the requested access site 110 corresponds to the calibration location 116. This will be referred to as the "current" calibration location. Next, the controller 126 searches the calibration data 128 for information pertinent to the current calibration location (step 508). For instance, this may include logical calibration data previously calculated in step 406 based on the other accessor's physical calibration. Alternatively, logical calibration may be performed in this step 508 if it has not been already performed for the current calibration location. In another circumstance, the relevant calibration data may arise from physical calibration performed by the accessor 104 earlier in step 402.

With this data in hand, the controller 126 retrieves and/or calculates the nominal coordinates of the requested access site 116, and applies the retrieved calibration data to compute a calibrated location for this site (step 510). Optionally, step 510 may be performed the first time the accessor controller 124 is directed to the current access site, and the calibrated location stored in 128 for expedited retrieval and use when the accessor controller 124 is directed to this access site in the future. Finally, in step 512, the controller 126 moves to the access site and carries out the requested access. If the current access request involves multiple access sites, the foregoing steps 506–512 are repeated for each access site.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method of calibrating accessors of portable data storage media in a library that includes the accessors and multiple calibration locations, the method comprising operations of:

physically calibrating the accessors to various calibration locations such that each of a prescribed group of the calibration locations has at least one accessor physically calibrated thereto, and such that each accessor is calibrated to at least one calibration location in common with another accessor;

sharing physical calibration information among the accessors;

for each subject accessor that has not been physically calibrated to all calibration locations of the prescribed group, processing shared physical calibration information from at least one other accessor to logically calibrate the subject accessor to calibration locations of the prescribed group for which the subject accessor has not been physically calibrated.

2. The method of claim 1, the accessors utilizing a common coordinate system to nominally identify calibration locations;

the processing operation comprising operations of:

determining a difference in calibration to the common calibration location between the subject accessor and another accessor;

adjusting a coordinate system of subject accessor by the difference to render calibration information of the other accessor directly applicable to the subject accessor.

3. The method of claim 1, the accessors being two in number and the calibrating operation comprising:

calibrating a first one of the accessors to all calibration locations of the prescribed group and calibrating a second one of the accessors to the common calibration location.

4. The method of claim 1, the calibrating operation comprising:

calibrating different accessors to one or more calibration locations in common, and one or more different calibration locations.

5. The method of claim 1, the processing operation comprising:
   determining a spatial relationship between the subject accessor and at least one of the other accessors by performing operations comprising:
      comparing calibration information for at least one calibration location to which the subject accessor and one of said at least one of the other accessors have physically calibrated;
      applying the spatial relationship to shared calibration information from at least one other accessor to generate logical calibration information applicable to the subject accessor.

6. The method of claim 5,
   where the accessors are movable on a common track described by an x axis coordinate;
   where the operation of determining a spatial relationship further comprises:
      moving each accessor an entire length of the common track to measure its length;
      conditioning the comparing operation by a ratio of the measured lengths.

7. A method of utilizing accessors of portable data storage media in a library that includes multiple accessors and multiple calibration locations, the method comprising operations of:
   empirically determining positional relationships of different accessors to different of the calibration locations by physically moving the accessors to the calibration locations;
   repeating the following for each subject accessor:
      for any calibration locations to which the subject accessor's positional relationship has not been determined, calculating positional relationships of the subject accessor to those calibration locations utilizing information including a positional relationship of at least one other accessor to those calibration locations in conjunction with spatial relationships between the subject accessor and said at least one other accessor.

8. A method of utilizing accessors of portable data storage media in a library that includes multiple accessors and multiple calibration locations, the method comprising operations of:
   physically determining positional relationships between different accessors to different of the calibration locations;
   determining positional interrelationships between different accessors to at least one of the calibration locations in common;
   utilizing the positional interrelationships to logically calibrate each accessor to calibration locations for which the positional relationship to the accessor has not been physically determined.

9. The method of claim 8, the calibration locations having spatial relationships to various related access sites in the library, the utilizing operation being performed for an accessor and a particular calibration location in response to receipt of an instruction for that accessor to access one or more access sites related to the particular calibration location for which the positional relationship has not been physically determined.

10. A signal-bearing medium tangibly embodying a program of machine-readable instructions executable by a digital processing apparatus to perform operations to calibrate a subject accessor of portable data storage media in a library that includes multiple accessors and multiple calibration locations, said operations comprising:
   physically calibrating the subject accessor to one or more calibration locations such that the subject accessor is calibrated to at least one calibration location in common with at least one other accessor;
   sharing physical calibration information with at least one of the other accessors;
   processing shared physical calibration information from the at least one other accessor as needed to logically calibrate the subject accessor to calibration locations of the prescribed group for which the subject accessor has not been physically calibrated.

11. The medium of claim 10,
   the accessors utilizing a common coordinate system to nominally identify calibration locations;
   the processing operation comprising operations of:
      determining a difference in calibration to the common calibration location between the subject accessor and another accessor;
      adjusting a coordinate system of the subject accessor by the difference to render calibration information of at least one of the other accessors directly applicable to the subject accessor.

12. The medium of claim 10, the accessors being two in number and the calibrating operation comprising:
   calibrating a first one of the accessors to all calibration locations of the prescribed group and calibrating a second one of the accessors to the common calibration location.

13. The medium of claim 10, the calibrating operation comprising:
   calibrating different accessors to one or more calibration locations in common, and one or more different calibration locations.

14. The medium of claim 10, the processing operation comprising:
   determining a spatial relationship between the subject accessor and at least one of the other accessors by performing operations comprising:
      comparing calibration information for at least one calibration location to which the subject accessor and one of said at least one of the other accessors have physically calibrated;
   applying the spatial relationship to shared calibration information from at least one other accessor to generate logical calibration information applicable to the subject accessor.

15. The medium of claim 14,
   where the accessors are movable on a common track described by an x axis coordinate;
   where the operation of determining a spatial relationship further comprises:
      moving the subject accessor an entire length of the common track to measure its length;
      conditioning the comparing operation by a ratio of the measured length to a length of the common track as measured by another accessor.

16. A signal-bearing medium tangibly embodying a program of machine-readable instructions executable by a digital processing apparatus to perform operations to utilize a subject accessor of portable data storage media in a library that includes multiple accessors and multiple calibration locations, said operations comprising:
   empirically determining one or more positional relationships of the subject accessor to at least one calibration location by physically moving the subject accessor to the calibration location;

for any calibration locations to which the subject accessor's positional relationship has not been determined, calculating positional relationships of the subject accessor to those calibration locations utilizing information including positional relationships of at least one other accessor to those calibration locations in conjunction with spatial relationships between the subject accessor and said at least one other accessor.

17. A signal-bearing medium tangibly embodying a program of machine-readable instructions executable by a digital processing apparatus to perform operations to utilize a subject accessor of portable data storage media in a library that includes multiple accessors and multiple calibration locations, said operations comprising:

physically determining positional relationships between the subject accessor to at least one of the calibration locations;

determining one or more positional interrelationships between the subject accessor and at least one other accessor via a common calibration location;

utilizing the positional interrelationships to logically calibrate the subject accessor to calibration locations for which the positional relationship to the subject accessor has not been physically determined.

18. The medium of claim 17, the calibration locations having spatial relationships to various related access sites in the library, the utilizing operation being performed for a particular calibration location in response to receipt of an instruction for the subject accessor to access one or more access sites related to the particular calibration location for which the positional relationship has not been physically determined.

19. A logic circuit of multiple interconnected electrically conductive elements configured to perform operations to calibrate a subject accessor of portable data storage media in a library that includes multiple accessors and multiple calibration locations, the operations comprising:

physically calibrating the subject accessor to one or more calibration locations such that the subject accessor accessor is calibrated to at least one calibration location in common with at least one other accessor;

sharing physical calibration information with one or more of the other accessors;

processing shared physical calibration information from the at least one other accessor as needed to logically calibrate the subject accessor to calibration locations of the prescribed group for which the subject accessor has not been physically calibrated.

20. A logic circuit of multiple interconnected electrically conductive elements configured to perform operations to utilize a subject accessor of portable data storage media in a library that includes multiple accessors and multiple calibration locations, the operations comprising:

empirically determining one or more positional relationships of the subject accessor to at least one calibration location by physically moving the subject accessor to the calibration location;

for any calibration locations to which the subject accessor's positional relationship has not been determined, calculating positional relationships of the subject accessor to those calibration locations utilizing information including positional relationships of at least one other accessor to those calibration locations in conjunction with spatial relationships between the subject accessor and said at least one other accessor.

21. A logic circuit of multiple interconnected electrically conductive elements configured to perform operations to utilize a subject accessor of portable data storage media in a library that includes multiple accessors and multiple calibration locations, the operations comprising:

physically determining positional relationships between the subject accessor to at least one of the calibration locations;

determining one or more positional interrelationships between the subject accessor and at least one other accessor via a common calibration location;

utilizing the positional interrelationships to logically calibrate the subject accessor to calibration locations for which the positional relationship to the subject accessor has not been physically determined.

22. A library for managing portable data storage media, comprising:

multiple calibration locations;

at least two accessors;

one or more accessor controllers coupled to the accessors and configured to perform calibration operations comprising:

physically calibrating the accessors to various calibration locations such that each of a prescribed group of the calibration locations has at least one accessor physically calibrated thereto, and such that each accessor is calibrated to at least one calibration location in common with another accessor;

sharing physical calibration information among the accessors;

for each subject accessor that has not been physically calibrated to all calibration locations of the prescribed group, processing shared physical calibration information from at least one other accessor to logically calibrate the subject accessor to calibration locations of the prescribed group for which the subject accessor has not been physically calibrated.

23. A library for managing portable data storage media, comprising:

multiple calibration locations;

multiple accessors;

at least one accessor controller coupled to the accessors and configured to perform calibration operations comprising:

empirically determining positional relationships of different accessors to different of the calibration locations by physically moving the accessors to the calibration locations;

repeating the following for each subject accessor:

for any calibration locations to which the subject accessor's positional relationship has not been determined, calculating positional relationships of the subject accessor to those calibration locations utilizing information including positional relationships of at least one other accessor to those calibration locations in conjunction with a spatial relationship between the subject accessor and said at least one other accessor.

24. A library for managing portable data storage media, comprising:

multiple calibration locations;

multiple accessors;

one or more accessor controllers coupled to the accessors and configured to perform calibration operations comprising:

physically determining positional relationships between different accessors to different of the calibration locations;

determining positional interrelationships between different accessors to at least one of the calibration locations in common;

utilizing the positional interrelationships to logically calibrate each accessor to calibration locations for which the positional relationship to the accessor has not been physically determined.

25. A library for managing portable data storage media, comprising:

multiple calibration locations;

multiple accessor means for physically accessing various access sites;

controller means for calibrating the accessor means, by:
physically calibrating the multiple accessor means to various calibration locations such that each of a prescribed group of the calibration locations has at least one accessor means physically calibrated thereto, and such that each accessor means is calibrated to at least one calibration location in common with another accessor means;

sharing physical calibration information among the multiple accessor means;

for each subject accessor means that has not been physically calibrated to all calibration locations of the prescribed group, processing shared physical calibration information from at least one other accessor means to logically calibrate the subject accessor means to calibration locations of the prescribed group for which the subject accessor means has not been physically calibrated.

26. A library for managing portable data storage media, comprising:

multiple calibration locations;

multiple accessor means for physically accessing various access sites;

controller means for calibrating the accessor means, by:
empirically determining positional relationships of different accessor means to different of the calibration locations by physically moving the accessor means to the calibration locations;

repeating the following for each subject accessor means:
for any calibration locations to which the subject accessor means' positional relationship has not been determined, calculating positional relationships of the subject accessor means to those calibration locations utilizing information including positional relationships of at least one other accessor means to those calibration locations in conjunction with a spatial relationship between the subject accessor means and said at least one other accessor means.

27. A library for managing portable data storage media, comprising:

multiple calibration locations;

multiple accessor means for physically accessing various access sites;

controller means for calibrating the multiple accessor means, by:
physically determining positional relationships between different accessor means to different of the calibration locations;

determining positional interrelationships between different accessor means to at least one of the calibration locations in common;

utilizing the positional interrelationships to logically calibrate each accessor means to calibration locations for which the positional relationship to the accessor means has not been physically determined.

* * * * *